United States Patent
Heiss et al.

(10) Patent No.: US 7,613,206 B2
(45) Date of Patent: Nov. 3, 2009

(54) DETERMINATION OF CHARACTERISTICS DURING THE TRANSITION BETWEEN AN AAL2 SIGNALLING AND ANOTHER SIGNALLING

(75) Inventors: Herbert Heiss, Puchheim (DE); Bernhard Pfeil, München (DE)

(73) Assignee: Nokia Siemens Networks GmbH & Co. KG, Munich (DE)

( * ) Notice: Subject to any disclaimer, the term of this patent is extended or adjusted under 35 U.S.C. 154(b) by 546 days.

(21) Appl. No.: 10/548,107

(22) PCT Filed: Feb. 2, 2004

(86) PCT No.: PCT/EP2004/000935

§ 371 (c)(1),
(2), (4) Date: Sep. 6, 2005

(87) PCT Pub. No.: WO2004/079479

PCT Pub. Date: Sep. 16, 2004

(65) Prior Publication Data
US 2006/0215647 A1    Sep. 28, 2006

(30) Foreign Application Priority Data
Mar. 3, 2003  (EP)  .................... 03004653

(51) Int. Cl.
*H04J 3/16*  (2006.01)
*H04J 3/22*  (2006.01)

(52) U.S. Cl. .................... 370/466; 370/467; 370/395.6; 370/395.61

(58) Field of Classification Search .............. 370/395.6, 370/522, 466, 467, 401, 395.1, 465, 395.5, 370/395.2, 395.51, 395.52, 352, 351, 310.1, 370/410, 395.61
See application file for complete search history.

(56) References Cited

U.S. PATENT DOCUMENTS 5,604,737 A    2/1997    Iwami et al.

(Continued)

FOREIGN PATENT DOCUMENTS

EP    0841831 A2    5/1998

(Continued)

OTHER PUBLICATIONS

ITU International Telecommunication Union Telecommunication Standardization Sector, Geneva, 11 (Nov. 22, 2002), "Revision of Q15/11 to explicitly include RAN support", pp. 1-2.

(Continued)

*Primary Examiner*—Ayaz R Sheikh
*Assistant Examiner*—Chuong T Ho
(74) *Attorney, Agent, or Firm*—Laurence A. Greenberg; Werner H. Stemer; Ralph E. Locher

(57) ABSTRACT

The invention relates to a method and device for simple and efficient determining characteristics during a transition between an AAL2 signalling protocol and at least one another signalling protocol of at least one communication network. The inventive method and device are characterised in that at least one characteristic is determined on the basis of parametric values assigned to the AA2 signalling protocol and in that the determined characteristics are used for reproducing the parametric values of the AA2 signalling protocol in the parametric values of another signalling protocol.

18 Claims, 15 Drawing Sheets

| Definition | | Meaning |
|---|---|---|
| HBA: = [3*A/64*F]*64 | , if F > 0 | Estimation of the bit rate, caused by the AAL2 CPS packet header, for LC in forward direction for the peak bit rate |
| HBA: = 0 | , if F = 0 | |
| HBa: = [3*a/64*f]*64 | , if f > 0 | Estimation of the bit rate, caused by the AAL2 CPS packet header, for PLC in forward direction for the peak bit rate |
| HBa: = 0 | , if f = 0 | |
| HBB: = [3*B/64*F]*64 | , if F > 0 | Estimation of the bit rate, caused by the AAL2 CPS packet header, for LC in forward direction for the permanent bit rate |
| HBB: = 0 | , if F = 0 | |
| HBb: = [3*b/64*f]*64 | , if f > 0 | Estimation of the bit rate, caused by the AAL2 CPS packet header, for PLC in forward direction for the permanent bit rate |
| HBb: = 0 | , if f = 0 | |
| HBC: = [3*C/64*H]*64 | , if H > 0 | Estimation of the bit rate, caused by the AAL2 CPS packet header, for LC in reverse direction for the peak bit rate |
| HBC: = 0 | , if H = 0 | |
| HBc: = [3*c/64*h]*64 | , if h > 0 | Estimation of the bit rate, caused by the AAL2 CPS packet header, for PLC in reverse direction for the peak bit rate |
| HBc: = 0 | , if h = 0 | |
| HBD: = [3*D/64*H]*64 | , if H > 0 | Estimation of the bit rate, caused by the AAL2 CPS packet header, for LC in reverse direction for the permanent bit rate |
| HBD: = 0 | , if H = 0 | |
| HBd: = [3*d/64*h]*64 | , if h > 0 | Estimation of the bit rate, caused by the AAL2 CPS packet header, for PLC in reverse direction for the permanent bit rate |
| HBd: = 0 | , if h = 0 | |

U.S. PATENT DOCUMENTS

| | | | |
|---|---|---|---|
| 6,339,594 B1 | 1/2002 | Civanlar et al. | |
| 6,567,425 B1 * | 5/2003 | Szabo et al. | 370/522 |
| 6,801,542 B1 * | 10/2004 | Subbiah | 370/467 |
| 7,283,533 B1 * | 10/2007 | Kumar et al. | 370/395.52 |
| 7,327,740 B2 * | 2/2008 | Racz et al. | 370/395.6 |
| 7,477,638 B1 * | 1/2009 | Kumar et al. | 370/356 |

FOREIGN PATENT DOCUMENTS

| | | |
|---|---|---|
| RU | 2000102653 A | 7/1998 |
| WO | 9901978 A2 | 1/1999 |
| WO | WO 01/13599 A1 | 2/2001 |
| WO | WO 0113599 A | 2/2001 |

OTHER PUBLICATIONS

Rytina; Ian: TSG-RAN Meeting #18; Dec. 6, 2002 pp. 1-28.

AAL type 2 signalling protocol—Capability set 1, ITU_T Q.2630.1, pp. 11, 27-28, 35-36, 48.

AAL2 signalling protocol—Capability Set 2, ITU-T Q.2630.2, Dec. 2000, pp. 4-5, 11, 15, 17.

Support of IP-based services using IP transfer capabilities, ITU-T Y.1241, Mar. 2001, pp. 2-5, 7-8.

ATM UNI Signalling specification V4.1, The ATM Forum Technical Committee, Apr. 2002, pp. 41-42.

Eneroth, G. et al. (Jun. 1999) . "Applying ATM/AAL2 as a Switching Technology in Third-Generation Mobile Access Networks," IEEE Communications Magazine, IEEE Service Center 37 (6): 112-122.

Http://slovari.yandex.ru/dict/informatica.

TSG-RAN Meeting #18; New Orleans, US Dec. 3-6, 2002; RP-020833; Ian Rytina; Revision of Q15/11 to Explicitly Include RAN Support.

IEICE Technical Report; vol. 91; No. 381; Dec. 13, 1991; Interworking Between B-ISDN and N-ISDN.

International Telecommunication Union, ITU-T I.378, (Dec. 2002) "Series I: Integrated Services Digital Network—Overall network aspects and functions—General network requirements and functions—Traffic control and congestion control at the ATM Adaptation Layer type 2", ITU-T Recommendation I.378.

International Telecommunications Union, ITU-T Y.1221 (Mar. 2002) "Series Y: Global Information Infrastructure and Internet Protocol Aspects—Internet protocol aspects—Architecture, access, network capabilities and resource management—Traffic control and congestion control in IP based networks", ITU-T Recommendation Y.1221.

* cited by examiner

FIG. 1

| SSISU parameter table |
|---|
| I = maximal length of the SSSAR-SDU in forward direction |
| J = maximal length of the SSSAR-SDU in reverse direction |

| IPTC parameter table |
|---|
| U = peak bit rate in forward direction |
| V = permanent bit rate in forward direction |
| W = peak bit rate in reverse direction |
| X = permanent bit rate in reverse direction |
| Y = maximal permitted packet size in forward direction |
| Z = maximal permitted packet size in reverse direction |

| LC parameter table |
|---|
| A = maximal CPS-SDU bit rate in forward direction |
| B = medium CPS-SDU bit rate in forward direction |
| C = maximal CPS-SDU bit rate in reverse direction |
| D = medium CPS-SDU bit rate in reverse direction |
| E = maximal CPS-SDU size in forward direction |
| F = medium CPS-SDU size in forward direction |
| G = maximal CPS-SDU size in reverse direction |
| H - medium CPS-SDU size in reverse direction |

| TC parameter subtable |
|---|
| U = peak CPS bit rate in forward direction |
| V = permanent CPS bit rate in forward direction |
| W = peak CPS bit rate in reverse direction |
| X = permanent CPS bit rate in reverse direction |
| Y = maximal permitted CPS size in forward direction |
| Z = maximal permitted CPS size in reverse direction |

FIG. 2

PLC parameter table a = maximal CPS-SDU bit rate in forward direction
b = medium CPS-SDU bit rate in forward direction
c = maximal CPS-SDU bit rate in reverse direction
d = medium CPS-SDU bit rate in reverse direction
e = maximal CPS-SDU size in forward direction
f = medium CPS-SDU size in forward direction
g = maximal CPS-SDU size in reverse direction
h - medium CPS-SDU size in reverse direction

PTC parameter subtable u = peak CPS bit rate in forward direction
v = permanent CPS bit rate in forward direction
w = peak CPS bit rate in reverse direction
x = permanent CPS bit rate in reverse direction
y = maximal permitted CPS size in forward direction
z = maximal permitted CPS size in reverse direction

PIPTC parameter table u = peak bit rate in forward direction
v = permanent bit rate in forward direction
w = peak bit rate in reverse direction
x = permanent bit rate in reverse direction
y = maximal permitted packet size in forward direction
z = maximal permitted packet size in reverse direction

FIG. 3

| Definition | | Meaning |
|---|---|---|
| HBA: = [3*A/64*F]*64<br>HBA: = 0 | , if F > 0<br>, if F = 0 | Estimation of the bit rate, caused by the AAL2 CPS packet header, for LC in forward direction for the peak bit rate |
| HBa: = [3*a/64*f]*64<br>HBa: = 0 | , if f > 0<br>, if f = 0 | Estimation of the bit rate, caused by the AAL2 CPS packet header, for PLC in forward direction for the peak bit rate |
| HBB: = [3*B/64*F]*64<br>HBB: = 0 | , if F > 0<br>, if F = 0 | Estimation of the bit rate, caused by the AAL2 CPS packet header, for LC in forward direction for the permanent bit rate |
| HBb: = [3*b/64*f]*64<br>HBb: = 0 | , if f > 0<br>, if f = 0 | Estimation of the bit rate, caused by the AAL2 CPS packet header, for PLC in forward direction for the permanent bit rate |
| HBC: = [3*C/64*H]*64<br>HBC: = 0 | , if H > 0<br>, if H = 0 | Estimation of the bit rate, caused by the AAL2 CPS packet header, for LC in reverse direction for the peak bit rate |
| HBc: = [3*c/64*h]*64<br>HBc: = 0 | , if h > 0<br>, if h = 0 | Estimation of the bit rate, caused by the AAL2 CPS packet header, for PLC in reverse direction for the peak bit rate |
| HBD: = [3*D/64*H]*64<br>HBD: = 0 | , if H > 0<br>, if H = 0 | Estimation of the bit rate, caused by the AAL2 CPS packet header, for LC in reverse direction for the permanent bit rate |
| HBd: = [3*d/64*h]*64<br>HBd: = 0 | , if h > 0<br>, if h = 0 | Estimation of the bit rate, caused by the AAL2 CPS packet header, for PLC in reverse direction for the permanent bit rate |

FIG. 4

| TC parameter subtable | Value |
|---|---|
| U | A + HBA |
| V | B + HBB |
| W | C + HBC |
| X | D + HBD |

| IPTC parameter subtable | Value |
|---|---|
| U | A + HBA |
| V | B + HBB |
| W | C + HBC |
| X | D + HBD |

| TC parameter subtable | Value |
|---|---|
| u | a + HBa |
| v | b + HBb |
| w | c + HBc |
| x | d + HBd |

| IPTC parameter subtable | Value |
|---|---|
| u | a + HBa |
| v | b + HBb |
| w | c + HBc |
| x | d + HBd |

FIG. 5

- A = B
- a = b
- C = D
- c = d
- E = F
- e = f
- G = H
- g = h
- MSLC not present

FIG. 6

| Definition | Meaning |
|---|---|
| HBA: = [IPHL * A/64*F]*64 , if F > 0<br>HBA: = 0 , if F = 0 | Estimation of the bit rate portion caused by the IP header at given LC in forward direction for the peak bit rate |
| HBa: = [IPHL * a/64*f]*64 , if f > 0<br>HBa: = 0 , if f = 0 | Estimation of the bit rate portion caused by the IP header at given PLC in forward direction for the peak bit rate |
| HBB: = [IPHL * B/64*F]*64 , if F > 0<br>HBB: = 0 , if F = 0 | Estimation of the bit rate portion caused by the IP header at given LC in forward direction for the permanent bit rate |
| HBb: = [IPHL * b/64*f]*64 , if f > 0<br>HBb: = 0 , if f = 0 | Estimation of the bit rate portion caused by the IP header at given PLC in forward direction for the sustainable bit rate |
| HBC: = [IPHL * C/64*H]*64 , if H > 0<br>HBC: = 0 , if H = 0 | Estimation of the bit rate portion caused by the IP header at given LC in reverse direction for the peak bit rate |
| HBc: = [IPHL * c/64*h]*64 , if h > 0<br>HBc: = 0 , if h = 0 | Estimation of the bit rate portion caused by the IP header at given PIPCT in reverse direction for the peak bit rate |
| HBD: = [IPHL * D/64*H]*64 , if H > 0<br>HBD: = 0 , if H = 0 | Estimation of the bit rate portion caused by the IP header at given LC in reverse direction for the permanent bit rate |
| HBd: = [IPHL * d/64*h]*64 , if h > 0<br>HBd: = 0 , if h = 0 | Estimation of the bit rate portion caused by the IP header at given PLC in reverse direction for the permanent bit rate |

FIG. 7

| IPTC parameter table | Value |
|---|---|
| Y | IPHL + MAX (E, I) |
| Z | IPHL + MAX (G, J) |

| PIPTC parameter table | Value |
|---|---|
| y | IPHL + MAX (e, I) |
| z | IPHL + MAX (g, J) |

FIG. 8

| Definition | | Meaning |
|---|---|---|
| HBU: = [IPHL * U/64*Y]*64 | , if Y > 0 | Estimation of the bit rate portion caused by the IP header at given IPTC in forward direction for the peak CPS-SDU bit rate |
| HBU: = 0 | , if Y = 0 | |
| HBu: = [IPHL * u/64*y]*64 | , if y > 0 | Estimation of the bit rate portion caused by the IP header at given PIPTC in forward direction for the peak CPS-SDU bit rate |
| HBu: = 0 | , if y = 0 | |
| HBV: = [IPHL * V/64*Y]*64 | , if Y > 0 | Estimation of the bit rate portion caused by the IP header at given IPTC in forward direction for the medium CPS-SDU bit rate |
| HBV: = 0 | , if Y = 0 | |
| HBv: = [IPHL * v/64*Y]*64 | , if y > 0 | Estimation of the bit rate portion caused by the IP header at given PIPTC in forward direction for the medium CPS-SDU bit rate |
| HBv: = 0 | , if y = 0 | |
| HBW: = [IPHL * W/64*Z]*64 | , if Z > 0 | Estimation of the bit rate portion caused by the IP header at given IPTC in reverse direction for the peak CPS-SDU bit rate |
| HBW: = 0 | , if Z = 0 | |
| HBw: = [IPHL * w/64*z]*64 | , if z > 0 | Estimation of the bit rate portion caused by the IP header at given PIPTC in reverse direction for the peak CPS-SDU bit rate |
| HBw: = 0 | , if z = 0 | |
| HBX: = [IPHL * X/64*Z]*64 | , if Z > 0 | Estimation of the bit rate portion caused by the IP header at given IPTC in reverse direction for the medium CPS-SDU bit rate |
| HBX: = 0 | , if Z = 0 | |
| HBx: = [IPHL * x/64*z]*64 | , if z > 0 | Estimation of the bit rate portion caused by the IP header at given PIPTC in reverse direction for the medium CPS-SDU bit rate |
| HBx: = 0 | , if z = 0 | |

FIG. 9

| LC parameter table | Value |
|---|---|
| A | U-HBU |
| B | V-HBV |
| C | W-HBW |
| D | X-HBX |

| PIPTC parameter table | Value |
|---|---|
| a | u-HBu |
| b | v-HBv |
| c | w-HBw |
| d | x-HBx |

FIG. 10

| LC parameter table | Value |
|---|---|
| A | U-HBU |
| B | U-HBU |
| C | W-HBW |
| D | W-HBW |

| PIPTC parameter table | Value |
|---|---|
| a | u-HBu |
| b | u-HBu |
| c | w-HBw |
| d | w-HBw |

FIG. 11

| LC parameter table | Value |
|---|---|
| E, F | MIN (Y-IPHL, 45) |
| G, H | MIN (Z-IPHL, 45) |

| PLC parameter table | Value |
|---|---|
| e, f | MIN (Y-IPHL, 45) |
| g,h | MIN (z-IPHL, 45) |

FIG. 12

| SSISU parameter table | Value |
|---|---|
| I | MAX (Y-IPHL, y-IPHL45) |
| J | MAX (Z-IPHL, z-IPHL45) |

| PIPTC parameter table | Value |
|---|---|
| y | IPHL + MAX (e, I) |
| z | IPHL + MAX (g, J) |

FIG. 13

- A = B
- C = D
- E = F
- G = H
- MSLC not present

FIG. 16

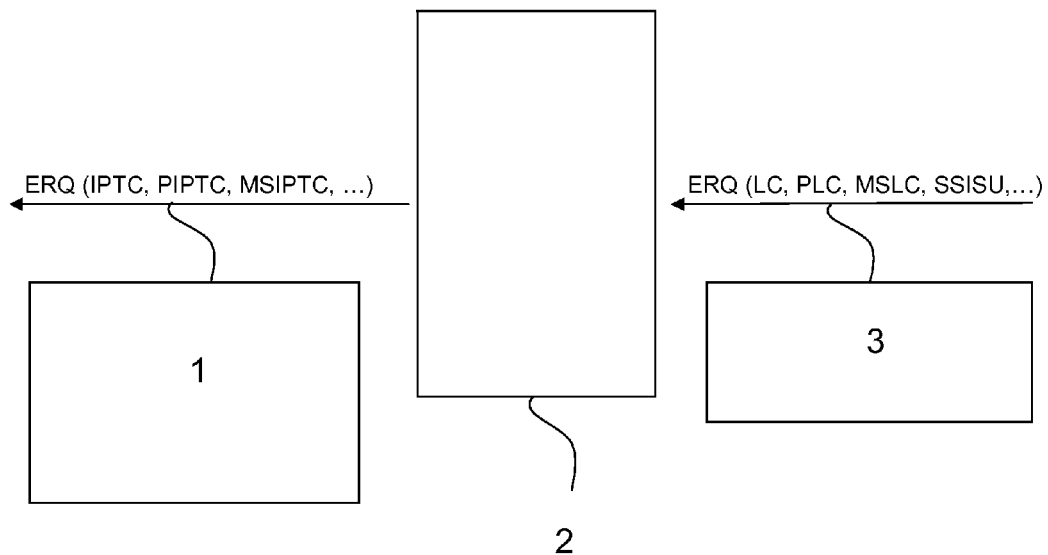

| | |
|---|---|
| SSISU: | Service specific information |
| IPTC: | IP transfer characteristic |
| PIPTC: | Preferred IP transfer characteristic |
| MSxy: | Modification support for IP transfer characteristic |

1. Outgoing information upon a request for establishing a connection according to Q.IPC.CS1 signaling
   IPTC and PIPTC characteristics derived from PL, PLC and SSISU parameter values
2. AAL2 processing unit
   - Transition of (PL, PLC and SSISU) characteristics to (IPTC, PIPTC)
   - TC class determination
3. Outgoing information upon a request for establishing a connection according to Q.2630 signaling

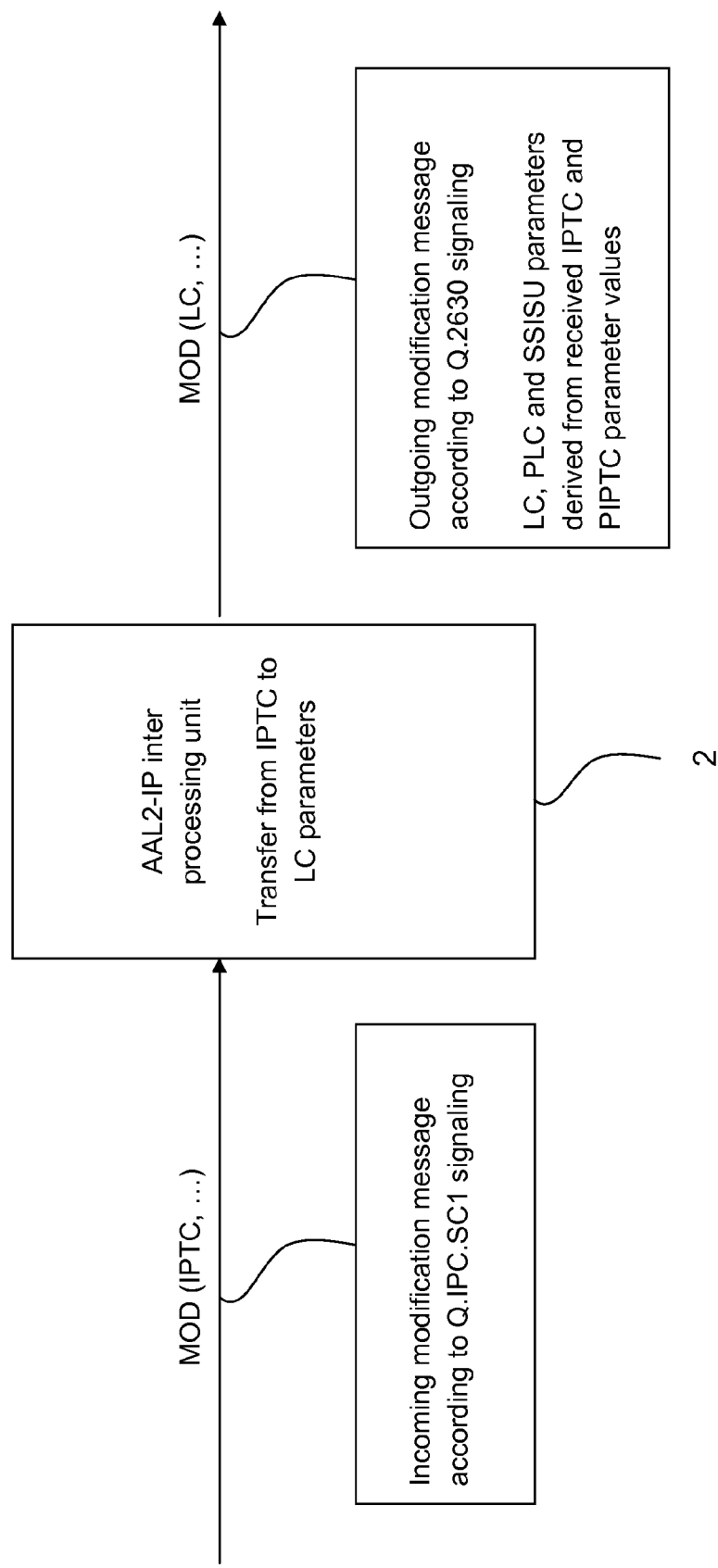

DETERMINATION OF CHARACTERISTICS DURING THE TRANSITION BETWEEN AN AAL2 SIGNALLING AND ANOTHER SIGNALLING

Determination of characteristics for the transition between an AAL2 signaling protocol and a further signaling protocol.

The invention relates to a method and a device for transitioning an AAL2 signaling protocol into at least one further signaling protocol of at least one communication network.

The document D1 (Ian Rytina, "TSG-RAN Meeting #18 including attachment 2 (Q.AA12IPiw. CS1)" ITU-T TSG-RAN Meeting #18, [Online] 6 Dec. 2002 (2002 Dec. 6), pages 1-28, Interworking between AAL type 2 Signalling Protocol Capability Set 2 and IPALCAP Signalling Protocol Capability Set 1) defines the interworking between the AAL Type 2 signaling protocol capability set 2 and the IPALCAP signaling protocol. The interworking between the two signaling protocols usually occurs in the 3GPP access networks (UTRANs) with AAL type 2 and IP network units which are connected via an "interworking unit".

The document D2 (WO 01/13599 A2) describes a method and a device for providing an interworking unit between ATM networks and IP networks. A gateway unit is provided for connecting an ATM (AAL 2)-based access/core network to an IP network. The gateway unit acts as an interface between the first and second network. In the proposed solution the first network uses a first type of signaling and the second network uses a second type of signaling, the interface translating the signaling between the first and second networks. The interface further includes a control plane for translating signaling between the first and second network and/or a user plane for converting user data from the first type of signaling to the second type of signaling. The control plane maps services between the first and second networks and transfers the services between the first and second networks. The interface includes at least one interface module and one multiplexing module.

At the ITU-T, a signaling protocol for IP connections ("IP Connection Control Protocol") is being standardized under the working title Q.IPC.CS1. This type of signaling is used in particular in IP-based networks known as radio access networks (hereinafter abbreviated to RAN). In this scheme provision is made using, for example, what is known as an interworking unit to connect network elements from IP-based RANs to such network elements from ATM Adaptation Layer Type 2 (hereinafter referred to as AAL2)-based RANs. It is provided to specify the resource requirements on the IP side by means of a parameter value called IP Transfer Capability (hereinafter abbreviated to IPTC) in accordance with ITU-T Recommendation Y.1221. Corresponding to this are what are known as the link characteristics (hereinafter referred to as LC) for the AAL2 side if the AAL2 signaling protocol conforming to ITU-T Recommendations Q.2630.1 or Q.2630.2 is supported there. The signaling protocol for ATM Adaptation Layer Type 2 connections is likewise being standardized at the ITU-T under the title Q.2630. The standardization is taking place in what are referred to as "capability sets", which build on top of one another. In the recommendation title, capability sets are qualified by means of suffixes, so "Q.2630.1", for example, stands for Capability Set 1 (the abbreviation "CS" is used for "Capability Set" in the remainder of this description). The standardization work has been completed for CS1 and CS2 and is still in progress for CS3. For interworking purposes there arises the problem of translating between LC- and IPTC-type parameters. This relates to the link characteristics (LC) and what are termed "Preferred Link Characteristics" (hereinafter abbreviated to PLC) or, as the case may be, "IP Transfer Capability" (IPTC) and what is termed "Preferred IP Transfer Capability" (hereinafter referred to as PIPTC) in the respective connection setup request (Establish Request) messages and the link characteristics and IP transfer capabilities in the respective modification request (Modify Request) messages. In addition, the so-called SSISU parameter in the Establish Request message of the AAL2 signaling protocol also has to be taken into account. Resource requirements for an AAL2 connection are signaled in CS1 and CS2 by the Link Characteristics parameter values. For CS3, provision has been made to support Transfer Capabilities (hereinafter abbreviated to TC) in accordance with I.378, which are intended to replace the LC completely in CS3 networks. Thus, at transition points (gateways) from CS2 to CS3 networks or subnetworks there is the problem of translating resource requirements signaled by means of LC by CS2 or CS1 network nodes into TC. This relates to the Link Characteristics and Preferred Link Characteristics in the Establish Request as well as to the Link Characteristics in the Modify message.

The object of the present invention is therefore to develop a method for transitioning between an AAL2 signaling protocol and a further signaling protocol.

The object is achieved according to the invention by the subject matter of the independent claims. Developments of the invention are specified in the dependent claims. The core of the invention is that characteristics of the parameter values are determined and used for performing the transition between an AAL2 signaling protocol and a further signaling protocol. The characteristics are determined here according to previously defined conditions and rules.

An advantage of the present invention is that the solution presented is both easy to implement and cost-effective.

The invention will be explained in more detail with reference to an exemplary embodiment illustrated in the figures. Specifically, the figures show:

FIG. 1 Tables of the LC, TC, SSISU and IPTC parameters,

FIG. 2 Tables of the PLC, PTC and PIPTC parameters,

FIG. 3 Determination of the bit rate for the transition from LC or, as the case may be, PLC to TC or, as the case may be, PTC, FIG. 4 Conversion tables for the reception of Establish Request messages and Modify Request messages, FIG. 5 Conditions for the choice of the Transfer Capabilities class, FIG. 6 Determination of the bit rate for the transition from LC or, as the case may be, PLC to IPTC or, as the case may be, PIPTC, FIG. 7 Rules for determining the maximum permitted packet size, FIG. 8 Determination of LC or, as the case may be, PLC bit rates for given IPTC or, as the case may be, PIPTC, FIG. 9 Conversion tables for the Statistical Bandwidth Transfer Capability (SBW-TC), FIG. 10 Conversion tables for the Desired Bandwidth Transfer Capability (DBW-TC), FIG. 11 Rules for determining the maximum CPS-SDU size and the average CPS-SDU size, FIG. 12 Rules for determining the SSISU parameter, FIG. 13 Conditions for choosing the IP Transfer Capability class, FIG. 14 Transition from LC or, as the case may be, PLC to TC or, as the case may be, PTC in the case of an Establish Request message, FIG. 15 Transition from LC or, as the case may be, PLC to TC or, as the case may be, PTC in the case of a Modify Request message, FIG. 16 Transition from LC or, as the case may be, PLC to IPTC or, as the case may be, PIPTC in the case of an Establish Request message, FIG. 17 Transition from IPTC or, as the case may be, PIPTC to LC or, as the case may be, PLC in the case of an Establish Request message, FIG. 18 Transition from LC or, as the case may be, PLC to IPTC or, as the case may be, PIPTC in the case of a Modify Request message, FIG. 19 Transition from IPTC or, as the case may be, PIPTC to LC or, as the case may be, PLC in the case of a Modify Request message.

FIG. 1 shows the characteristics and the acronyms used in the application for the Link Characteristics parameter (LC), Transfer Capabilities parameter (TC), SSISU parameter (SSISU) and IP Transfer Capability parameter (IPTC) in tables.

FIG. 2 shows the characteristics and the acronyms used in the application for the Preferred Link Characteristics parameter (PLC), Preferred Transfer Capabilities parameter (PTC) and Preferred IP Transfer Capability parameter (IPTC) in tables.

Figure 14:
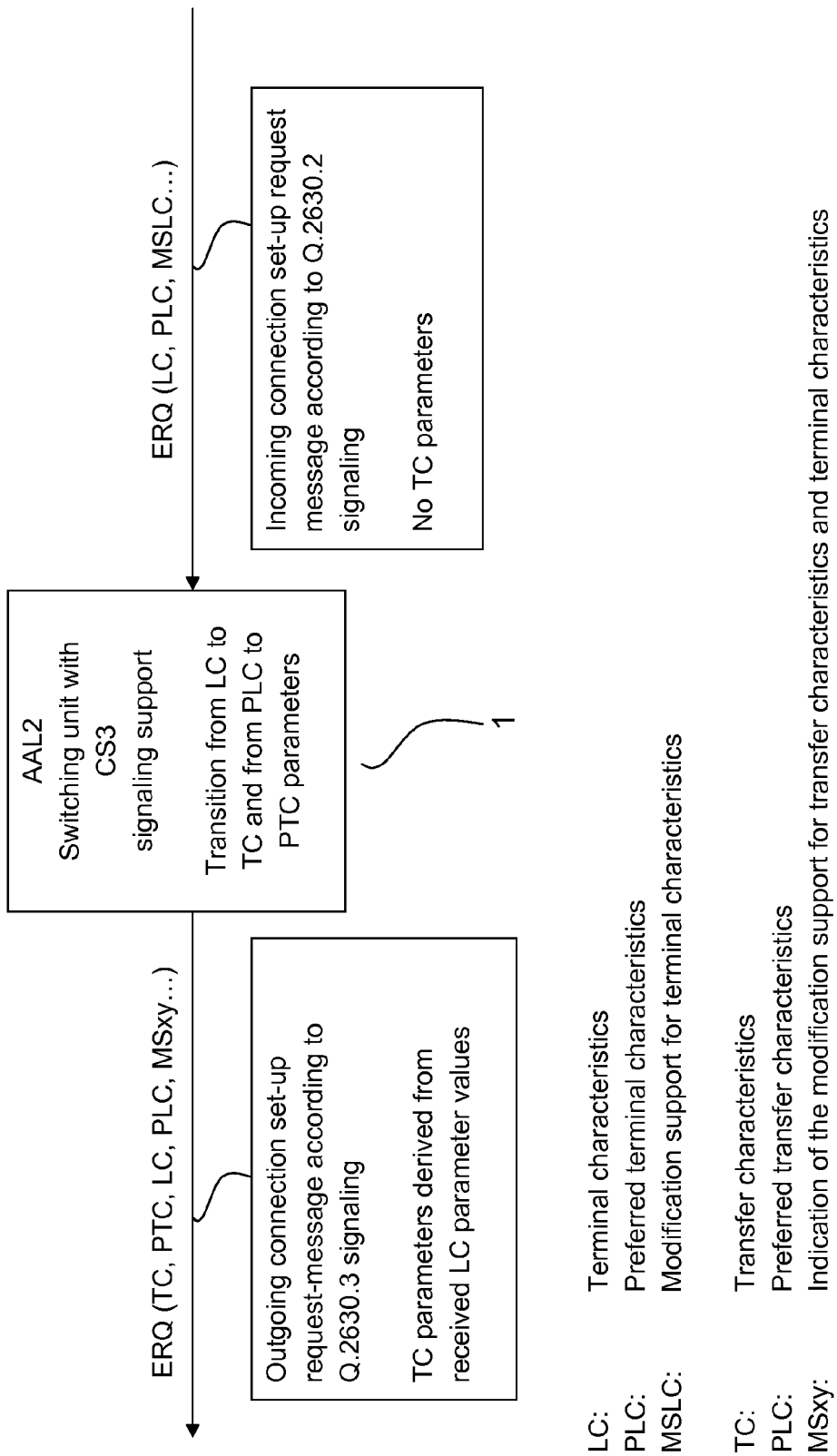

FIG. 3 shows how, in order to convert the LC-type bandwidth specification to a TC-type bandwidth specification, it is necessary to estimate the bandwidth requirement caused by the ATM Adaptation Layer Type 2 (AAL2) packet header. This is done using the sizes given in the table. In the present example "bits per second" (bps) is used as the unit for the bit rate, and "octet" for sizes, such as, for example, a CPS-SDU. The estimation of the bit rate requirement caused by the CPS packet header for the peak CPS bit rates is determined with reference to the average CPS-SDU size. This is necessary since without knowledge of the service that is being supported it cannot be assumed that the peak bit rate is also only achieved via CPS packets with the maximum size. In order to determine the bit rate, the number N of packets per second at the peak rate is determined with reference to the average CPS-SDU size. The CPS packet header rate is then computed by multiplication of the number N by the length of the CPS packet header. This is followed by the normalization to integral multiples of 64 bps. The normalization to integral multiples of 64 bps is based on the 64 bps granularity currently adopted in the ongoing standardization work for the signaling of bit rates in IPTC parameters.

FIG. 4 shows the conversion tables defined from FIG. 3. By means of these conversion tables, among other things a lower limit for the peak bit rate specifications in the TC and PTC is determined on the basis of given LC or, as the case may be, PLC values, said lower limit being optimized on the assumption of the lack of knowledge regarding the service that is to be supported. Said conversion tables for TC and PTC are used, for example, in an AAL2 switching unit 1 upon reception of Establish Request messages (ERQ) and Modify Request messages (MOD) from the CS2 network or, as the case may, subnetwork which do not already contain TC or PLC parameters. The conversion tables for IPTC and PIPTC are used, for example, in an interworking unit 2 upon reception of Establish Request messages (ERQ) and Modify Request messages (MOD) from AAL2 networks or, as the case may be, subnetworks which employ signaling conforming to Q.2630.1 or Q.2630.2.

FIG. 5 shows the conditions for choosing the "Fixed Bandwidth Transfer Capability" if the conditions in relation to the LC parameter values and the MSLC (Modify Support for Link Characteristics) parameter are met in the Establish Request messages (ERQ) from the CS2 network or subnetwork. If at least one of these conditions is not satisfied, then either the "Variable Bandwidth—Stringent Transfer Capability" or "Variable Bandwidth—Tolerant Transfer Capability" should be estimated, whereby it is necessary to specify this choice in the network node on an individual network basis, for example as a function of the knowledge of the services used and/or the chosen path type of the AAL2 path used for the incoming connection. This determination of the Transfer Capabilities class takes place upon reception of the Establish Request messages (ERQ) from the CS2 network or subnetwork.

FIG. 6 shows how, in order to convert the LC-type bandwidth specification to IPTC-type, it is necessary in particular to estimate the bandwidth requirement caused by the IP header. This is done using the sizes contained in the table. All sizes defined in this table should be understood as "bits per second". The normalization to integral multiples of 64 bps is based on the 64 bps granularity currently adopted in the ongoing standardization work for the signaling of bit rates in IPTC parameters. It is important here in particular that reference is made to the average CPS-SDU size in order to estimate the bit rate requirement caused by the IP header for the peak CPS-SDU bit rate. This is necessary since without knowledge of the supported service it cannot be assumed that the peak bit rate is also only achieved via CPS packets with the maximum size. For this reason it is necessary to refer to the respective "average CPS-SDU size" for a reliable estimate.

FIG. 7 shows how the maximum permitted packet size for IPTC and PIPTC parameters is determined from the LC, PLC and SSISU values. These conversion tables are used, for example, in an interworking unit upon reception of Establish Request messages (ERQ) (IPTC and PIPTC) and Modify Request messages (MOD) (IPTC) from AAL2 networks or subnetworks which employ signaling conforming to Q.2630.1 or Q.2630.2.

FIG. 8 shows how the IP header bit rates are determined for given (Preferred) IPTC parameters. In order to convert the IPTC-type bandwidth specification to LC-type specifications it is necessary in particular to estimate the bandwidth requirement caused by the IP header. This is done using the sizes listed in FIG. 8. It should be noted here that there are several classes of IP Transfer Capability which differ in particular also by reason of the bit rate specifications defined by them. The table should be regarded as generic in this case. Which sizes are actually relevant and need to be determined is specified in the tables in FIGS. 9 and 10 for the Statistical and the Desired Bandwidth Transfer Capability. All the sizes defined in said tables should be understood as being in "bits per second". The normalization to integral multiples of 64 bps is based on the 64 bps granularity currently adopted in the ongoing standardization work for the signaling of bit rates in IPTC parameters. It is important here in particular that reference is made to the "maximum permitted packet size" in order to estimate the bit rate requirement caused by the IP header at the values given in the IPTC and PIPTC. By this means, if the service that is to be supported is not known, the optimum estimate is achieved, based on the given information.

FIGS. 9 and 10 show the conversion tables defined from FIG. 8 for the Statistical Bandwidth Transfer Capability (SBW-TC) and the Desired Bandwidth Transfer Capability (DBW-TC). By means of the above tables, among other things a lower limit for the peak bit rate specifications in the LC and PLC is therefore determined on the basis of given IPTC or, as the case may be, PIPTC values, said lower limit being optimized on the assumption of the lack of knowledge regarding the service that is to be supported. Said conversion tables for TC and PTC are used, for example, in an interworking unit 2 upon reception of Establish Request messages (ERQ) and Modify Request messages (MOD) from IP networks or, as the case may be, subnetworks which employ signaling conforming to the IP Connection Control Signaling Protocol (Q.IPC.CS1).

FIG. 11 shows how the maximum CPS-SDU size and the average CPS-SDU size are determined in LC and PLC parameters. Said conversion tables are used, for example, in an interworking unit upon reception of Establish Request messages and Modify Request messages from IP networks or subnetworks which employ signaling conforming to the IP Connection Control Signaling Protocol (Q.IPC.CS1). The maximum CPS-SDU size and/or average CPS-SDU size are/is determined from the minimum of the maximum permitted packet size minus the length of the header of the IP packet of the IP Transfer Capability and/or Preferred IP Transfer Capability and the maximum permissible CPS-SDU size. The maximum permissible CPS-SDU is specified here as 45 octets.

FIG. 12 shows how the SSISU parameter is determined from IPTC or, as the case may be, PIPTC parameters. The PIPTC parameters are only to be taken into account if the interworking unit supports a modification of the LC and IPTC. The SSISU parameter is determined from the maximum of the maximum permitted packet size minus the length of the header of the IP packet of the IP Transfer Capability, the maximum permitted packet size minus the length of the header of the IP packet of the Preferred IP Transfer Capability, and the maximum permissible CPS-SDU size.

In addition, if $$I=J=45$$

holds true, then no SSISU parameter is formed. This condition expresses the fact that, based on the available information (IPTC, PIPTC) on the AAL2 side, no segmentation in accordance with ITU-T Recommendation I.366.1 is necessary and therefore also no SSISU parameter is required in the Establish Request messages. These conversion tables are used, for example, in an interworking unit upon reception of Establish Request messages and Modify Request messages from IP networks or subnetworks which employ signaling conforming to the IP Connection Control Signaling Protocol (Q.IPC.CS1).

FIG. 13 shows the conditions for determining the IPTC class. The "Desired Bandwidth Transfer Capability" should be chosen if the conditions with regard to the LC parameter values and the MSLC parameter are met in the Establish Request message from the AAL2 network or subnetwork. If at least one of these conditions is not met, then the "Statistical Bandwidth Transfer Capability" should be estimated. These rules are applied for example in an interworking unit upon reception of Establish Request messages from AAL2 networks or subnetworks which employ signaling conforming to ITU-T Recommendation Q.2630.1 or Q.2630.2.

FIG. 14 shows how LC or, as the case may be, PLC parameters transition to TC or, as the case may be, PTC parameters in an AAL2 switching unit 1 with CS3 signaling support. When an Establish Request message conforming to Q.2630.2 signaling is received in the AAL2 switching unit 1, the LC or, as the case may be, PLC parameters are mapped into TC or, as the case may be, PTC parameters in accordance with the rules and conditions.

Figure 15:
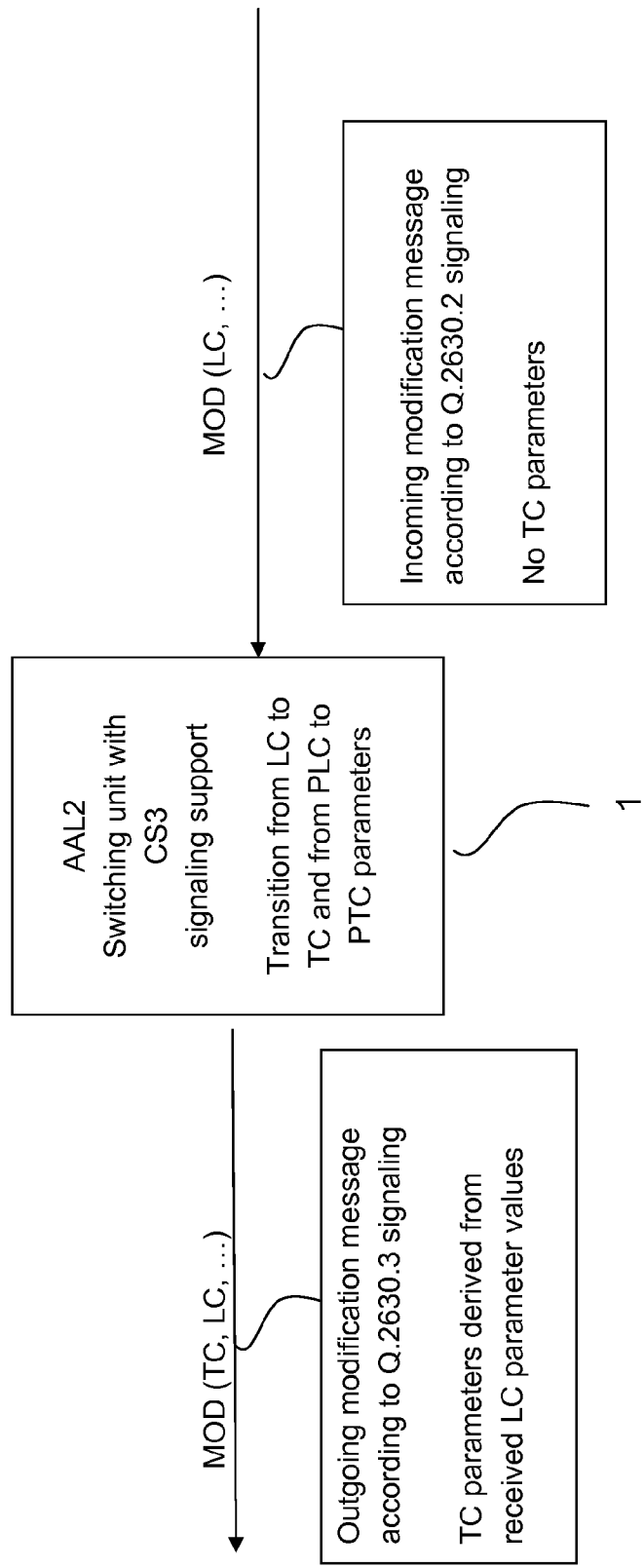

FIG. 15 shows how LC and PLC parameters transition to TC and PTC parameters when a Modify Request message is received in an AAL2 switching unit 1 with CS3 signaling support.

FIG. 16 shows how, in an AAL2-IP interworking unit 2, LC or, as the case may be, PLC parameters in an Establish Request message conforming to Q.2630 signaling transition to IPTC or, as the case may be, PIPTC parameters in an Establish Request message conforming to Q.IPC.CS1 signaling.

Figure 17:
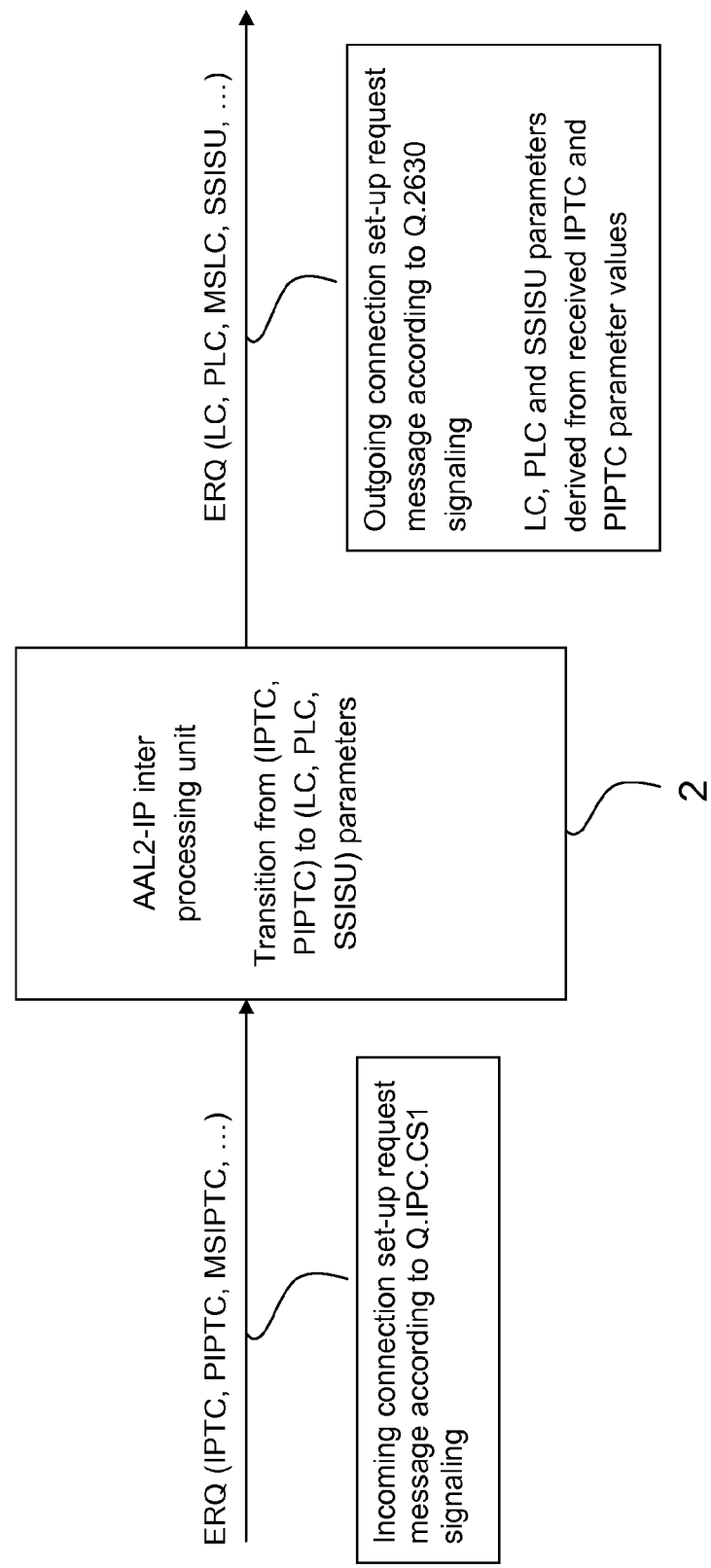

FIG. 17 shows how, in an AAL2-IP interworking unit 2, IPTC or, as the case may be, PIPTC parameters in an Establish Request message conforming to Q.IPC.CS1 signaling transition to LC or, as the case may be, PLC parameters in an Establish Request message conforming to Q.2630 signaling.

Figure 18:
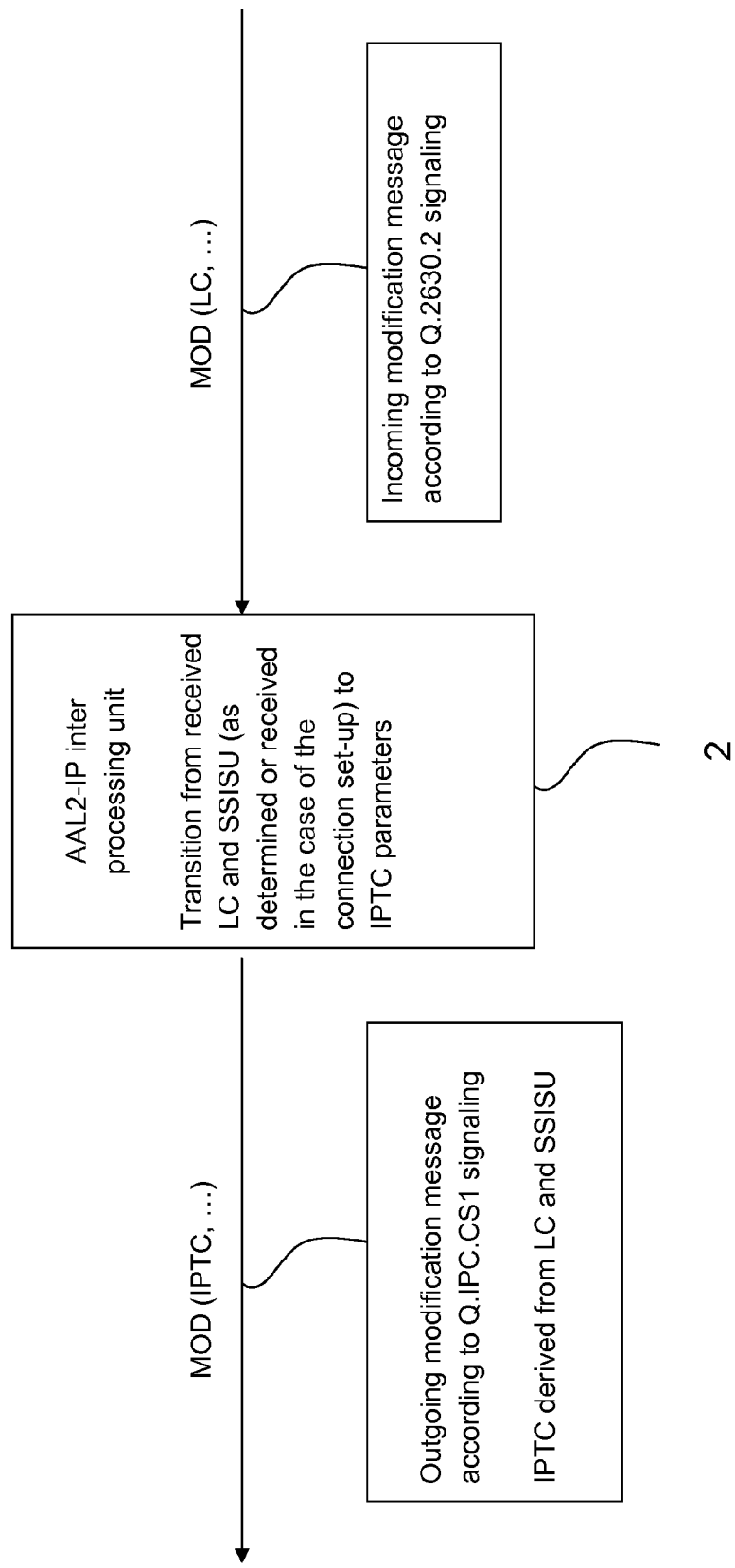

FIG. 18 shows how, in an AAL2-IP interworking unit 2, LC or, as the case may be, PLC parameters in a Modify Request message conforming to Q.2630.2 signaling transition to IPTC or, as the case may be, PIPTC parameters in a Modify Request message conforming to Q.IPC.CS1 signaling.

FIG. 19 shows how, in an AAL2-IP interworking unit 2, IPTC or, as the case may be, PIPTC parameters in a Modify Request message conforming to Q.IPC.CS1 signaling transition to LC or, as the case may be, PLC parameters in a Modify Request message conforming to Q.2630 signaling.

The invention claimed is:

1. A method for transitioning an AAL2 signaling protocol into at least one further signaling protocol of at least one communication network, comprising:

in processing unit, determining at least one characteristic from the parameter values specified for the AAL2 signaling protocol; and in the processing unit, using the determined characteristics for mapping parameter values of the AAL2 signaling protocol into parameter values of the further signaling protocol, wherein a transition is performed to convert the Link Characteristics parameter values of the AAL2 signaling protocol to the Transfer Capabilities parameter values of the AAL2 signaling protocol;

wherein a transition is performed to convert the Link Characteristics parameter values of the AAL2 signaling protocol to the IP Transfer Capability parameter values of a signaling protocol for IP connections; and wherein in order to determine the bit rate for the transition of the Link Characteristics parameter values of the AAL2 signaling protocol to the IP Transfer Capability parameter values of a signaling protocol for IP connections, a minimum header bit rate on the IP side is determined from a number of data packets per time unit of the peak rate at maximum packet size and the bit rate is determined in conjunction with the peak byte rate.

2. The method as claimed in claim 1, wherein a transition is performed to convert the Preferred Link Characteristics parameter values of the AAL2 signaling protocol to the Preferred Transfer Capabilities parameter values of the AAL2 signaling protocol.

3. The method as claimed in claim 1, wherein a transition is performed to convert the Preferred Link Characteristics parameter values of the AAL2 signaling protocol to the Preferred IP Transfer Capability parameter values of a signaling protocol for IP connections.

4. The method as claimed in claim 1 wherein the transition of parameter values of the AAL2 signaling protocol to a further signaling protocol is performed on the basis of an Establish Request or Modify Request.

5. The method as claimed in claim 1 wherein the bit rates, the maximum permitted packet size, the maximum CPS-SDU size, the average CPS-SDU size, the SSISU parameter or the IP Transfer Capability class are determined as characteristics of parameter values.

6. The method as claimed in claim 1, wherein in order to determine the bit rate for the transition of the Link Characteristics parameter values of the AAL2 signaling protocol to the Transfer Capabilities parameter values of the AAL2 signaling protocol, the number of peak rate data packets per time unit relative to the average CPS-SDU size is established and the bit rate determined in conjunction with the length of a packet header.

7. The method as claimed in claim 1, wherein the maximum permitted packet size is determined from the maximum CPS-SDU size, the maximum length of the SSSAR-SDU and the length of the IP packet header.

8. The method as claimed in claim 1, wherein during the determination of the characteristics a normalization to an integral multiple of 64 bits per second is performed.

9. The method as claimed in claim 1, wherein at least one of the maximum CPS-SDU size and average CPS-SDU size are/is determined from the minimum of the maximum permitted packet size minus the length of the header of the IP packet of the IP Transfer Capability or Preferred IP Transfer Capability and the maximum permissible CPS-SDU size.

10. The method as claimed in claim 1, wherein the SSISU parameter is determined from the maximum of the maximum permitted packet size minus the length of the header of the IP packet of the IP Transfer Capability, the maximum permitted packet size minus the length of the header of the IP packet of the Preferred IP Transfer Capability and the maximum permissible CPS-SDU size.

11. The method as claimed in claim 10, wherein the Desired Bandwidth Transfer Capability is chosen on the basis of previously defined conditions in relation to at least one of the link characteristics and MS link characteristics of an Establish Request from an AAL2 network and that if at least one of said conditions is not met, the Statistical Bandwidth Transfer Capability will be used as the IP Transfer Capability class.

12. The method as claimed in claim 11, wherein the IP Transfer Capability class is determined upon reception of an Establish Request from an interworking unit.

13. The method as claimed claim 1, wherein the IP packet header, the UDP header and, for connections that use RTP, the RTP header are used for determining the length of the IP packet header.

14. The method as claimed in claim 1, herein the characteristics for the transition of the AAL2 signaling protocol to a signaling protocol for IP connections are determined in an interworking unit.

15. The method as claimed in claim 1, wherein the characteristics for the transition of the AAL2 signaling protocol to a further AAL2 signaling protocol are determined in an AAL2 switching device.

16. A device for transitioning an AAL2 signaling protocol into at least one further signaling protocol of at least one communication network, comprising:
 a receive unit for receiving parameter values of an AAL2 signaling protocol;
 a processing unit for determining at least one characteristic from parameter values specified for the AAL2 signaling protocol and for mapping parameter values of the AAL2 signaling protocol into Transfer Capability parameter values of the further signaling protocol; and
 a transmit unit for transmitting the mapped parameter values of the further signaling protocol, wherein a transition is performed to convert the Link Characteristics parameter values of the AAL2 signaling protocol to the Transfer Capabilities parameter values of the AAL2 signaling protocol;
 wherein a transition is performed to convert the Link Characteristics parameter values of the AAL2 signaling protocol to the IP Transfer Capability parameter values of a signaling protocol for IP connections; and
 wherein in order to determine the bit rate for the transition of the Link Characteristics parameter values of the AAL2 signaling protocol to the IP Transfer Capability parameter values of a signaling protocol for IP connections, a minimum header bit rate on the IP side is determined from a number of data packets per time unit of a peak rate at maximum packet size and the bit rate is determined in conjunction with the peak byte rate.

17. The device as claimed in claim 16, wherein an AAL2 switching unit is provided as the device.

18. The device as claimed in claim 16, wherein an interworking unit is provided as the device.

* * * * *